S. G. CROSSLEY.
ROTARY VALVE FOR INTERNAL COMBUSTION ENGINES.
APPLICATION FILED SEPT. 15, 1915.
1,175,882.
Patented Mar. 14, 1916.
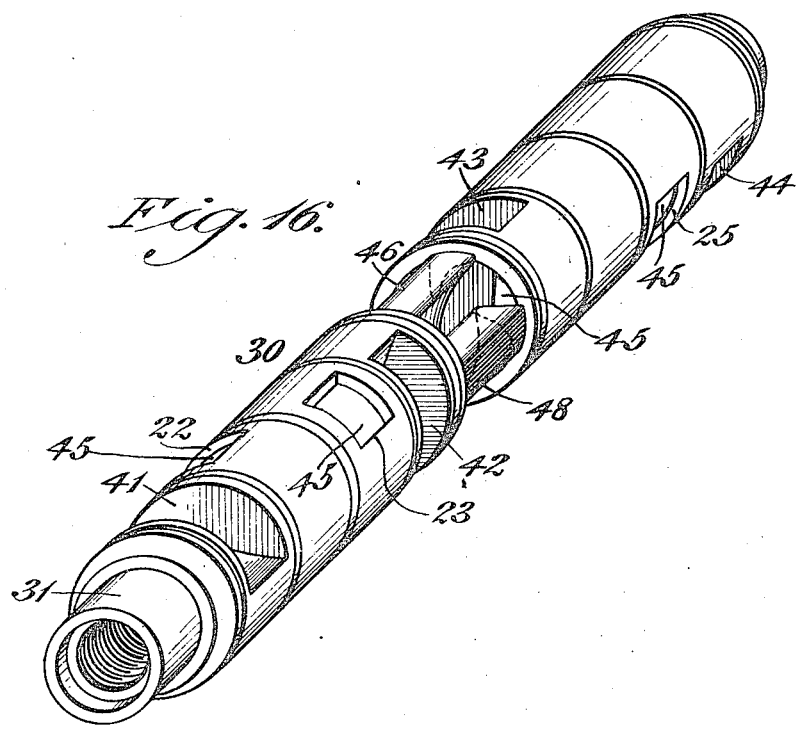
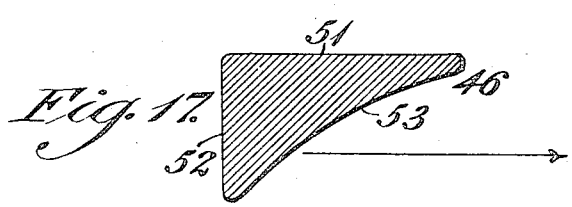
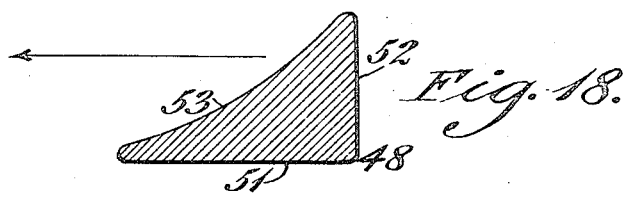

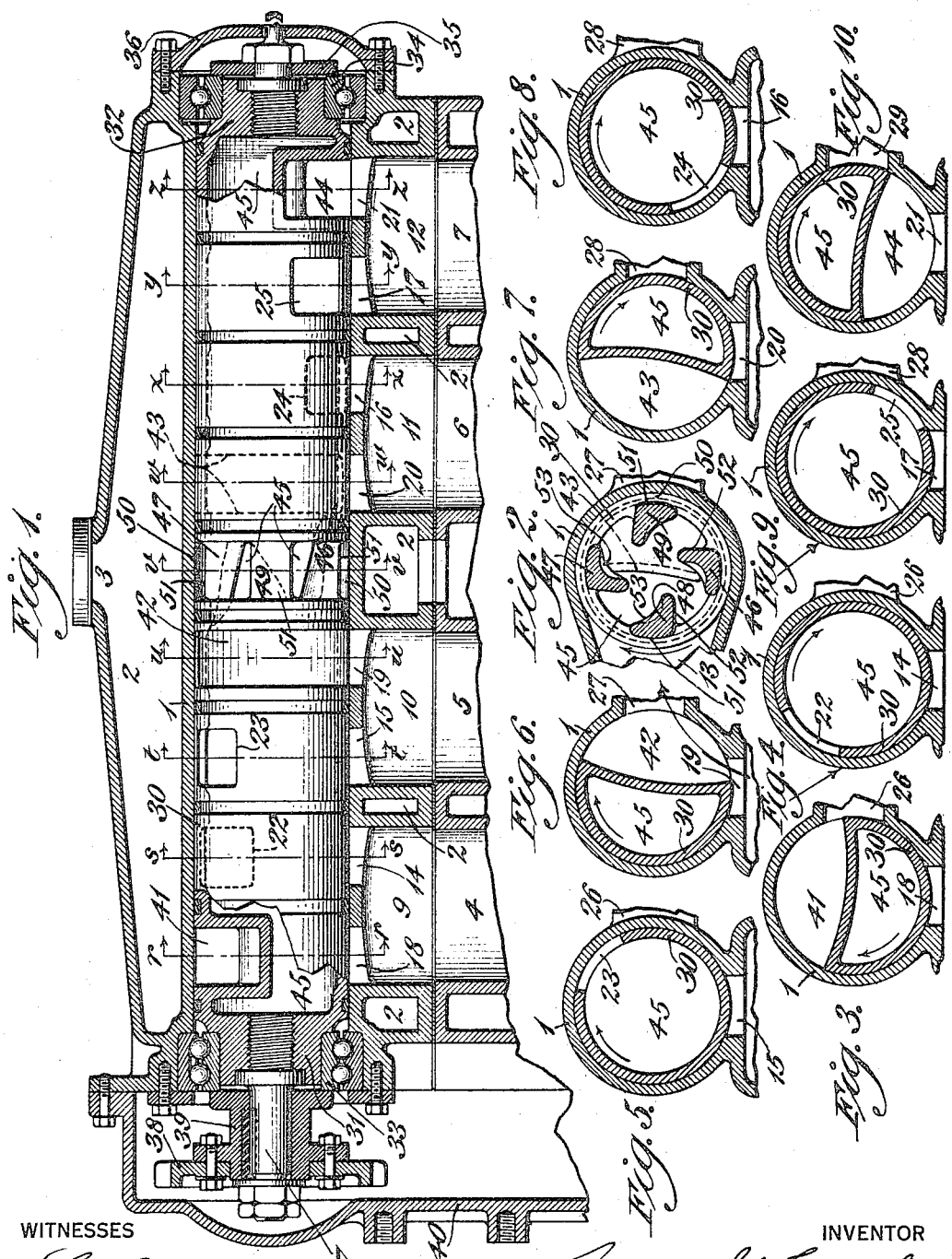

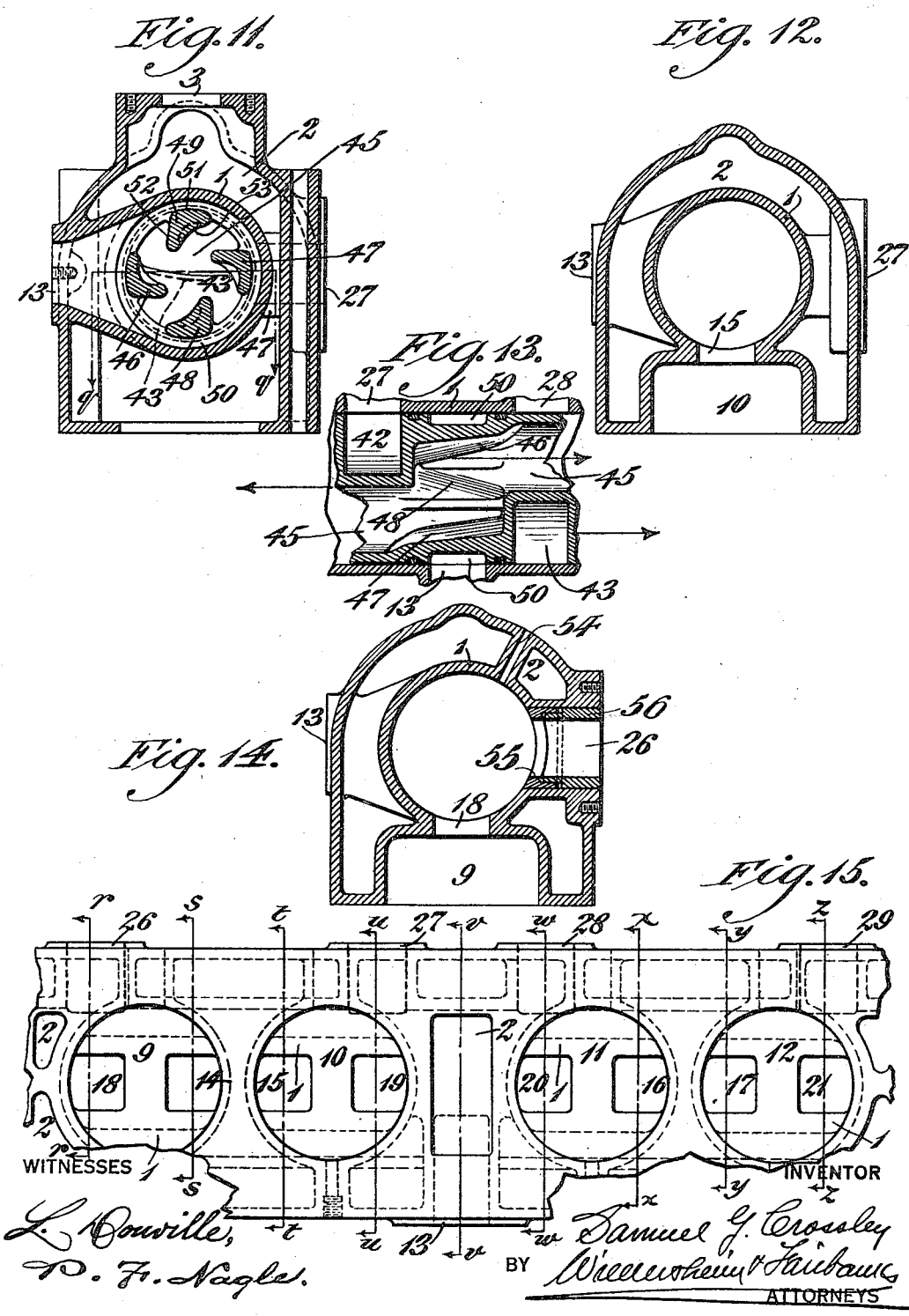

UNITED STATES PATENT OFFICE.

SAMUEL G. CROSSLEY, OF PHILADELPHIA, PENNSYLVANIA.

ROTARY VALVE FOR INTERNAL-COMBUSTION ENGINES.

1,175,882.  Specification of Letters Patent.  Patented Mar. 14, 1916.

Application filed September 15, 1915. Serial No. 50,769.

*To all whom it may concern:*

Be it known that I, SAMUEL G. CROSSLEY, a citizen of the United States, residing in the city and county of Philadelphia, State of Pennsylvania, have invented a new and useful Rotary Valve for Internal-Combustion Engines, of which the following is a specification.

My invention relates in general to rotary valves for use in connection with multiple cylinder internal combustion engines, being applicable to engines of two, three, four or more, cylinders, but being in this application represented as embodied in a four cylinder engine.

Broadly stated, my invention has for its object to assure that the maximum charge of the explosive mixture will be admitted into each engine cylinder during the cycle of the valve's operation.

My invention comprehends means for accomplishing the foregoing object, which comprises in combination with the other necessary elements, an injecting device located between the carbureter and the engine cylinders, which in the embodiment illustrated is a fan or bladed adjunct, preferably both within, and central within, the valve and midway of its length.

My invention further comprehends a bladed suction and propelling device which is an integral part of a hollow rotary valve itself, and the function of which is to cause the gaseous fuel to be both sucked into, and propelled toward the opposite ends of, the valve, so that an additional compression will be exerted upon the fuel prior to its injection into the engine cylinders.

A necessary function of my device is that in addition to the engine suction, the rotation of the valve and its bladed adjunct is utilized to exert additional suction of and compression upon the fuel and to impart to it a more or less spiral longitudinal travel, so that there is constantly introduced into each cylinder a predetermined quantity of explosive mixture equaling the maximum capacity of a cylinder, and approximately equaling the cubic contents of the valve.

The exhaust of the valve is, moreover, exceptionally large, being substantially half of the diameter of the valve, so that the waste products of combustion may rapidly and in entirety escape from the cylinders, leaving the entire containing area of each cylinder free to receive the full charge of the explosive mixture.

In the carrying out of my invention, I apply the additional compression upon the explosive mixture posterior to the carbureter and anterior to the engine cylinders, with the result that the compression so produced accomplishes a more intimate admixture and commingling of the particles of the explosive charge so as by the explosion in each engine cylinder to insure greater energy, efficiency, and increase in the power of the engine.

For the purpose of illustrating my invention, I have shown in the accompanying drawings a certain type and embodiment of it which is at present preferred by me because in practice it gives satisfactory and reliable results.

It is to be understood, however, that the various instrumentalities in which my invention is embodied can be variously arranged and organized and that my invention is not therefore limited to the precise arrangement and organization of these instrumentalities typified in the preferred construction shown in the accompanying drawings and herein described.

Referring to the drawings: Figure 1 represents a central, vertical, longitudinal, sectional elevation through my valve, and valve casing, a portion of the engine cylinders being also shown. Figs. 2 to 10 inclusive, are transverse sections through the valve casing and the valve, taken on the planes designated by the lettered dotted lines in Figs. 1 and 15, which respectively indicate the positions which the valve ports and the cylinder and casing ports occupy when the pistons of the cylinders are assumed to be in given positions in the cycle of their movements, the firing order of the cylinders being 4, 6, 7 and 5. Thus, Figs. 3 and 4 are sections, respectively upon the dotted lines *r—r* and *s—s* which represent the firing position of the ports of the valve which operate with cylinder 4, relatively to the coregistering ports of the casing, when the piston of cylinder 4 occupies its upper dead-center position. Thus, again, Figs. 5 and 6 are sections, respectively upon the dotted lines *t—t* and *u—u*, which represent the firing position of the ports of the valve which operate with cylinder 5, relatively to the co-registering ports of the casing, when the piston of cylinder 5 occupies its lower dead-center position. Thus, again, Figs. 7 and 8 are sections, respectively upon the dotted lines $w$—$w$ and $x$—$x$, which represent the firing position of the ports of the valve which operate with cylinder 6, relatively to the co-registering ports of the casing, when the piston of cylinder 6 occupies its lower dead-center position. Thus, further, Figs. 9 and 10 are sections respectively upon the dotted lines $y$—$y$ and $z$—$z$, which represent the firing position of the ports of the valve which operate with cylinder 7, relatively to the co-registering ports of the casing, when the piston of cylinder 7 occupies its upper dead-center position. Fig. 2 is a section on the dotted line $v$—$v$ through the fan, or bladed fuel-suction and propelling adjunct, of the valve proper. Fig. 11 represents a vertical, transverse, sectional elevation of the fan adjunct of the valve, in the plane of the dotted line $v$—$v$ of Fig. 1, illustrating also the intake port from the carbureter for all of the inlet ports. Fig. 12 represents a similar transverse sectional elevation through the valve casing and its water jacket, in the plane of the dotted line $t$—$t$ of Figs. 1 and 14, the valve being removed from its casing. Fig. 13 represents a horizontal section on the dotted line $q$—$q$ of Fig. 11, through the fan adjunct of the valve. Fig. 14 is a view similar to Fig. 12, sectional, however, on the line $r$—$r$ of Figs. 1 and 15. Fig. 15 is a plan of the under face of the valve casing, showing the explosion chambers, and showing also in dotted lines various compartments of the water jacket and the intake port of the casing, and in full lines the several casing inlet ports, casing exhaust ports, and valve exhaust channels. Fig. 16 represents in perspective the valve proper with its fan adjunct, removed from the valve casing. Figs. 17 and 18 are fragmentary transverse sectional diagrams through a pair of the blades of the fan adjunct, the arrows indicating the respective directions of their propulsive force.

Similar numerals of reference indicate corresponding parts.

Referring to the drawings: 1 designates the valve casing of any preferred construction, shown as inclosed in the usual water jacket 2 and provided with a water inlet 3. This casing embodies as a part of its basal formation the explosion chambers respectively designed from left to right in Fig. 1, as 9, 10, 11 and 12, which chambers are in fact the respective upper portions of the similarly designated engine cylinders 4, 5, 6 and 7, and may be regarded as parts of the cylinders.

13 designates an intake port from the carbureter (not shown), opening into the front of the valve casing and leading, in the embodiment shown, into the central portion of said casing and directly into and against that central portion of the valve proper which contains the fan bladed adjunct hereinafter explained.

As will be understood by an examination of the drawings, my rotary valve which operates in connection with all of the four cylinders, although as an entirety hollow throughout its length, may be considered as though it were divided into four parts or sections, so to speak, which are respectively provided with the respective valve inlet ports and valve exhaust channels which, by pairs, operate in conjunction with the correspondent casing inlet ports and casing exhaust ports of the engine cylinders 4, 5, 6 and 7.

Without further present discussion of the valve ports and the casing ports,—the hollow cylindrical body which constitutes the valve proper is in the drawings designated as 30, and its hollow interior as 45 and is supported relatively to the valve casing 1, within which it rotates, by a left hand journal 31 supported by and revoluble within a left hand casing ball-race 33—by a right-hand journal 32 revoluble within a right hand casing ball-race 34. An inclosing collar 35 is, for convenience screwed against the right-hand journal 32 and a cap 36 incloses the right-hand end of the valve casing.

The left-hand journal 31 of the valve is provided with an axially alined spindle 37, revoluble with the valve, and formed of a hub 39, which like the collar 35 of the right hand journal incloses the left-hand journal 31 and has formed upon it or connected with it a sprocket pinion 38 from which a sprocket chain (not shown) extends to the crank shaft, likewise not shown.

A gear case 40 incloses the sprocket gearing.

The hollow interior of the valve 30 I have, as stated, designated 45, and the valve as an entirety is provided with counterpart pairs of inlet ports, of which those to the left of the center are designated 22 and 23 and those to the right of the center 24 and 25. These valve inlet ports register respectively with the left-hand casing inlet ports 14 and 15, and with the right-hand casing inlet ports 16 and 17. The valve is also provided with counterpart valve exhaust channels, which to the left of the center are designated 41 and 42, and to the right of the center 43 and 44, and which in the rotation of the valve respectively register with the casing exhaust ports of which those upon the left are designated 18 and 19, and those upon the right 20 and 21, and also register with the ports which I designate as the casing outlet exhaust ports of which the two to the left of the center are 26 and 27 and the two to the right of the center 28 and 29.

In the various rotary positions of the valve represented in Figs. 3, 4, 5, 6, 7, 8, 9 and 10, already described, the respective valve inlet ports and valve exhaust channels will successively and respectively register with the casing inlet ports and with the casing exhaust ports, while the valve exhaust channels will register both with the casing inlet ports and with the casing exhaust ports.

In view of the relative positions of all of these ports shown in the drawings and already explained in defining what the several Figs. 3 to 10 of the drawings represent, the further description of the successive relationship and registration of the valve ports with respect to those of the casing in the rotation of the valve as an entirety, is believed to be unnecessary. It will be observed, however, that the segmental area, so to speak, of the valve exhaust channels 41, 42, 43 and 44, being exceptionally large, or as mentioned, approximately equaling, or almost of half, the diameter of the valve, assures the rapid and complete escape from the cylinders of the waste products of combustion.

In the preferred organization under description, the valve is externally channeled midway of its length, so as to form a circumferential recess 50, into which the carbureter intake port 13 leads, which permits of the complete surrounding of the central body-portion of the valve by the entering explosive fuel, which spreads rapidly around, between, and among the fan blades and is by them propelled to the right and left and throughout the length of the hollow interior of the valve. To carry into effect this object of my invention, I resort to a structure which I have termed a fan adjunct located centrally of the valve and which may be considered, essentially, as a rotary multiple-bladed fan the blades of which are preferably opposite counterparts and oppositely disposed, so that, in the rotation of the valve, they serve not only forcibly to suck the explosive into the hollow interior of the valve, but also forcibly to propel it in both directions to the right and to the left, longitudinally of the valve.

The form of the blades is not of the essence of the bladed adjunct, nor yet their dimensions or relative disposition, and they may be either integral with or applied to the body of the valve. I find it, however, of advantage, to resort to blades of the character represented in the drawings and particularly in Figs. 1, 2, 11, 13, 16, 17 and 18, in which each blade considered as a unit, possesses a peripheral surface 51 correspondent with and equal to the length of, but diametrically less than, that is distant from, the internal surface of the circumferential recess 50 of the valve body,—possesses also an in effect radial surface 52, say, some 15 degrees off the carbureter intake center—that is to say, angularly inclined with respect thereto, and a longitudinal concavity 53, with the result that a maximum of both suction and propelling force is assured, and the fan as an entirety is simple, durable and efficient.

It will now be apparent that I have devised a novel and useful construction of a rotary valve for internal combustion engines, which embodies the features of advantage enumerated as desirable in the statement of the invention and the above description, and while I have, in the present instance, shown and described a preferred embodiment thereof which will give in practice satisfactory and reliable results, it is to be understood that the same is susceptible of modification in various particulars without departing from the spirit or scope of the invention or sacrificing any of its advantages.

I preferably employ a desired number of oil holes 54, see Fig. 14, and a stationary leak proof bushing or ring 55 and outer bushings 56, said bushings 55 and 56 preventing leakage at the exhaust ports.

Having thus described my invention what I claim as new and desire to secure by Letters Patent, is:—

1. A device of the character stated, comprising in combination, a cylindrical port-provided valve casing, a plurality of port-provided engine cylinders, a cylindric port-provided hollow valve revoluble within the valve casing and the ports of which, in the cycle of the valve's operation, register predeterminedly with the ports of the casing, a fan adjunct to and revoluble with the valve and adapted both to suck into and longitudinally and oppositely distribute explosive mixture throughout the internal area of the valve and into predetermined engine cylinders, and comprising oppositely disposed blades,—a carbureter which feeds explosive mixture to the fan adjunct, and means for occasioning the rotation of the valve.

2. A device of the character stated, comprising in combination, a cylindrical port-provided valve casing, a plurality of port-provided engine cylinders, a cylindric port-provided hollow valve revoluble within the valve casing and the ports of which, in the cycle of the valve's operation, register predeterminedly with the ports of the casing, a fan adjunct to and revoluble with the valve and adapted both to suck into and longitudinally and oppositely distribute explosive mixture throughout the internal area of the valve and into predetermined engine cylinders, and comprising oppositely disposed and oppositely counterpart blades,—a carbureter which feeds explosive mixture to the fan adjunct, and means for occasioning the rotation of the valve.

3. A device of the character stated, comprising in combination, a cylindrical port-provided valve casing, a plurality of port-provided engine cylinders, a cylindric port-provided hollow valve revoluble within the valve casing, and the ports of which, in the cycle of the valve's operation, register predeterminedly with the ports of the casing, and which is circumferentially recessed internally toward the blades of its fan adjunct, a fan bladed adjunct to and revoluble with the valve and adapted both to suck in and longitudinally and oppositely distribute explosive mixture throughout the internal area of the valve, a carbureter which feeds explosive mixture to the fan adjunct, and means for occasioning the rotation of the valve.

4. In a device of the character stated, the combination with a cylindric valve casing, a plurality of engine cylinders, and a carbureter,—of a hollow rotary valve embodying a fan adjunct, which receives the explosive mixture from the carburetor and is composed of a plurality of pairs of oppositely disposed fan blades the external peripheral surfaces of which are encompassed by a circumferential recess.

5. In a device of the character stated, the combination with a cylindric valve casing, a plurality of engine cylinders, and a carbureter,—of a hollow rotary valve embodying a fan adjunct, which receives the explosive mixture from the carbureter and is composed of a plurality of pairs of oppositely disposed and inclined fan blades, the external peripheral surfaces of which are encompassed by a circumferential recess, the internally extending surfaces of which are angularly inclined with respect to the center of the carbureter intake, and the longitudinal faces of which are convex.

6. As an article of manufacture, a hollow cylindric valve, embodying in its external cylindric peripheral surface, inlet ports,—valve exhaust channels,—and a fan adjunct composed of a plurality of pairs of oppositely disposed and inclined fan blades, the external peripheral surfaces of which lie below the external periphery of the valve, the internally extending surfaces of which are angularly inclined with respect to the center of the carbureter intake, and the longitudinal faces of which are convex.

7. As an article of manufacture, a hollow cylindric valve, embodying in its external cylindric peripheral surface inlet ports, valve exhaust channels of segmental open area approximately equaling in depth half the diameter of the valve,—and a fan adjunct composed of a plurality of pairs of oppositely disposed and inclined fan blades, the external peripheral surfaces of which lie below the external periphery of the valve, the internally extending surfaces of which are angularly inclined with respect to the center of the carbureter intake, and the longitudinal faces of which are convex.

SAMUEL G. CROSSLEY.

Witnesses:
E. O. CAMPBELL,
NED NEY.